Nov. 8, 1932.   P. BURRELL ET AL   1,887,285
PRODUCTION OF COLORED EFFECTS BY LIGHTING
Filed Aug. 5, 1931    3 Sheets-Sheet 1

INVENTORS
Percy Burrell and
John A. Boothroyd
PER
Emil Bönnelycke
Attny.

Nov. 8, 1932.   P. BURRELL ET AL   1,887,285
PRODUCTION OF COLORED EFFECTS BY LIGHTING
Filed Aug. 5, 1931   3 Sheets-Sheet 2
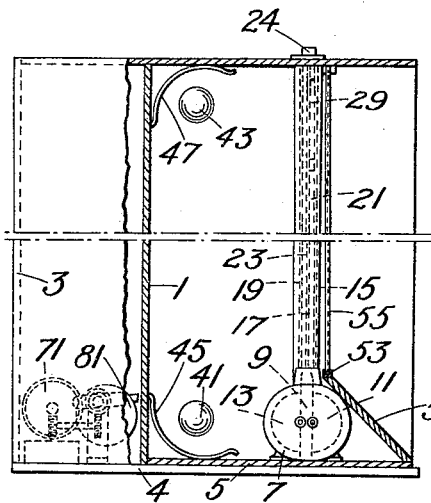
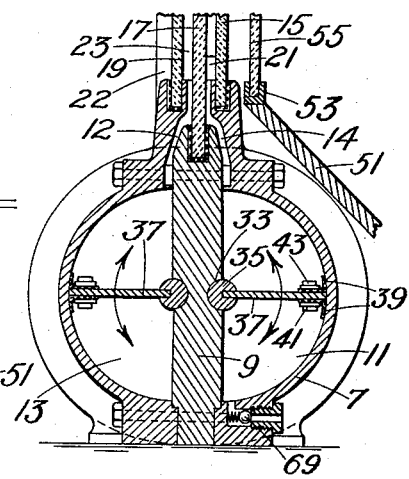
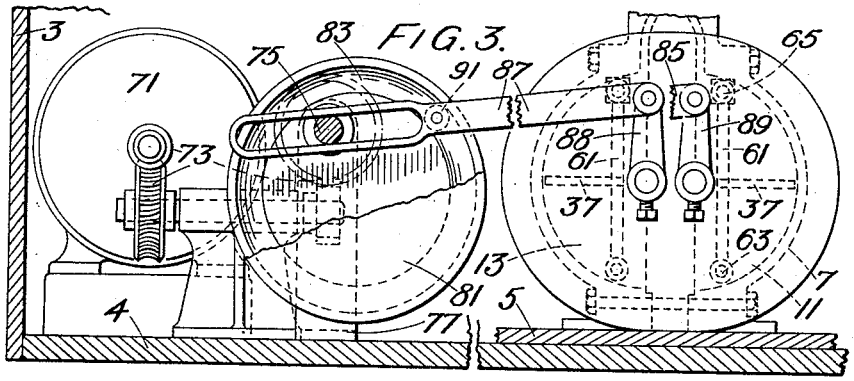
INVENTORS
Percy Burrell and
John A. Boothroyd
PER.
Emil Bönnelycke
Atty.

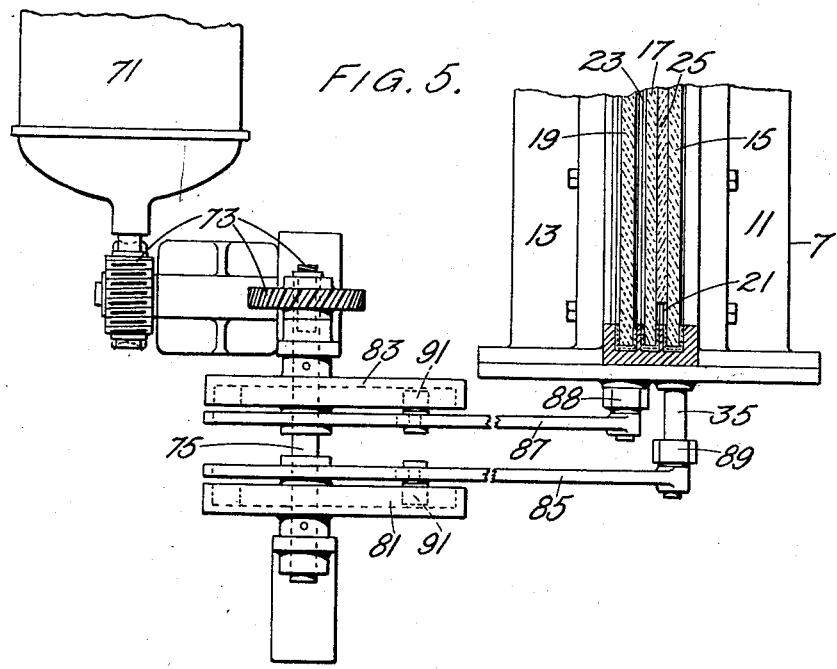
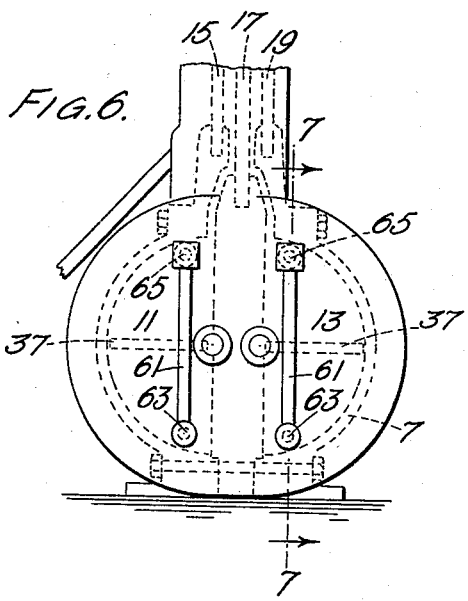
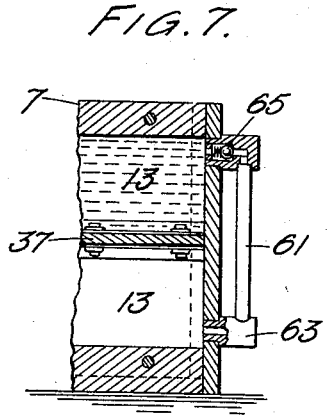

Patented Nov. 8, 1932

1,887,285

UNITED STATES PATENT OFFICE

PERCY BURRELL, OF WATFORD, HERTS, AND JOHN ALLEN BOOTHROYD, OF RICKMANSWORTH, HERTS, ENGLAND

PRODUCTION OF COLORED EFFECTS BY LIGHTING

Application filed August 5, 1931, Serial No. 555,376, and in Great Britain February 19, 1931.

The present invention is concerned with improvements in or relating to methods of and apparatus for the production of colored effects by means of light passing through a screen, the said apparatus having the following characteristics: (a) the screen is adapted if desired for the reception of advertising or like matter comprising a plurality of letters, words, figures or the like; (b) the screen is formed of a plurality of translucent sheets arranged one behind another and spaced from one another, the margins of each sheet being fixed in a frame so as to be liquid tight therein; (c) adjacent of the translucent sheets are arranged to form a rigid hollow compartment to receive liquid; (d) there is connected to the hollow compartment a reservoir for colored liquid; and (e) there is connected to the reservoir pumping means adapted to cause liquid therein to be discharged therefrom into the hollow compartment and to be retracted thereto from the said compartment; for example. the invention is concerned with flood lighting, spot lighting and projector lighting, and with changing colored signs, that is, signs (for example signs for advertising purposes) which are of the type adapted to change either by becoming alternately visible and invisible, and/or by changing color wholly or in part: the invention will be described illustratively in relation to an apparatus for an advertising sign of the type just referred to which is so small so to be suitable for advertising in a shop window.

One object of the invention is to provide a simple method of changing by the use of colored liquid colored lighting effects, for example, for flood, spot and projector lighting.

Another object of the invention is to provide a sign of the type referred to which can readily and easily be made to become invisible, or in which a change of color can sweep gradually across its area.

A further object is to provide such a sign as referred to which shall be readily capable of adaptation to different classes of signs, for example, shop window notices, shop facias, wall advertising signs, theatre and cinema transparencies, and the like.

One feature of the invention is a method of producing colored effects by lighting which is characterized by the use of colored liquid in a container and changing the position of the said liquid in its container relatively to the light so that the light is colored by the liquid to changing degrees.

Another feature of the invention is a method of producing colored effects by means of lighting which is characterized by the use of a compound screen having a hollow compartment through which light is projected, a liquid container connected to the said hollow compartment, colored liquid in the said container, and a device whereby the said liquid may be caused to flood and empty from the said compartment so as to color light passing through the screen. Thus, by causing the liquid to rise and fall in the hollow compartment the color of light passing through the screen may be changed. By the use of a compound screen having a number of compartments each associated with a separate liquid container considerable variation in the color of the light passing through the screen may be effected. Such a method may be of considerable use in connection with flood lighting and the like.

A further feature of the invention is apparatus for use in the production of colored effects by lighting which is characterized by a compound screen having a hollow compartment through which light may pass, a reservoir adapted to contain colored liquid connected to the said hollow compartment and so constructed and arranged that liquid may be forced from the reservoir into the said compartment to color the screen.

The various objects and the several features of the invention will become apparent to those skilled in the art from the following description, in conjunction with the accompanying diagrammatic drawings, of the aforementioned illustrative shop window advertising sign apparatus.

In the drawings:—

Fig. 2 is a diagrammatic left-hand end elevation on a smaller scale and partly in section, of the apparatus shown in Fig. 1;

Fig. 3 is a diagrammatic end elevation, with parts broken away of the liquid container and the driving mechanism;

Fig. 4 is a transverse section of the liquid container;

Fig. 5 is a plan view, partly in section, of certain parts of the apparatus;

Fig. 6 is an end elevation of the container from the end opposite to that shown in Fig. 3; and Fig. 7 is a detail showing the by-pass for leakage.

Figure 1:
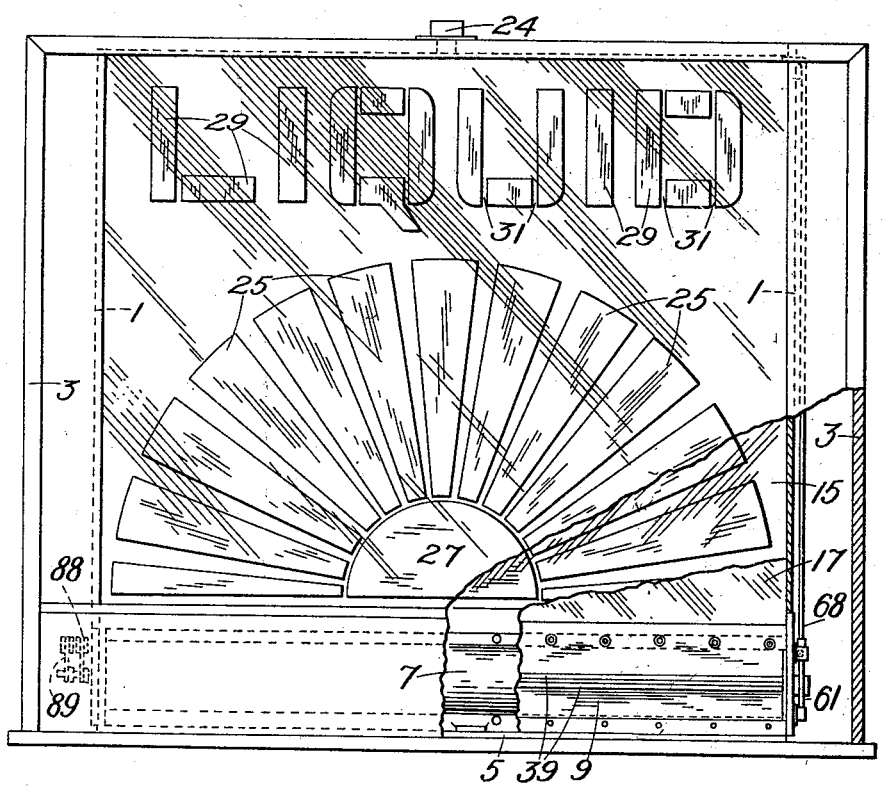
Fig. 1 is a front elevation, partly in section, of the illustrative apparatus.

The illustrative apparatus about to be described comprises an inner casing 1 containing the apparatus proper, together with the source of light, and an outer casing 3 to contain the inner casing and the driving mechanism of the apparatus.

Upon the base 5 (Fig. 2) of the inner casing 1 there is mounted a long hollow drum 7 (Fig. 4), the interior of which is divided by a diametrical partition 9 into two more-or-less semi-circular liquid reservoirs 11 and 13. Mounted upon the top of the drum is a screen comprising three parallel and vertical sheets 15, 17 and 19 of glass spaced from one another about 1/8 of an inch so that there are provided two vertical spaces 21 and 23 between the glass sheets; the sides of the rear sheet are supported by a fillet 22 of wood. The lower ends of the sheets 15 and 19 are let into recesses in an extension of the upper part of the drum 7, and the lower end of the sheet 17 is let into a recess in the upper part of the partition 9; the upper ends of the three glass sheets are connected together, the whole arrangement being such that the spaces 21 and 23 are liquid tight, except that at the top there is an air vent 24, Fig. 1.

In the front space 21 there are (in the particular illustrative apparatus being described) fixed between and to the two sheets of glass 15 and 17 a series of pieces of glass 25 (Fig. 1) and a semi-circular piece 27 arranged to form a diagrammatic sun and rays design as indicated in Fig. 1. In the upper portion of the space 21 there are arranged pieces of glass 29 to form letters which in the particular instance indicated in the drawings form the word Liquid. It will be noted with any letter having an interior space (such as Q or D) spaces as 31 are provided so as to form a passage-way to the interior of the letter. The vertical spaces 21 and 23 between the glass sheets are connected by passages 12 and 14 (Fig. 4) respectively to the liquid reservoirs 11 and 13. Each of these liquid reservoirs is of such size as to contain rather more liquid than is necessary to fill the space to which the reservoir is appropriated.

In a substantially semi-circular recess 33 in the partition 9 there is located a round spindle 35 from which there projects outwardly towards the circumference of the reservoir 11 a blade 37 to the outer end of which are connected leather packing pieces 39 by means of plates 41 and bolts 43; the reservoir 13 is similarly provided. Thus the reservoirs 11 and 13 are each adapted to act as the barrel of a pump with the blade 37 acting as the pump plunger. When the pump plunger 37 is moved upwardly in its reservoir 11 it will expel liquid from the reservoir to flood the connected vertical space 21 and surround the pieces of glass 25, 27 and 29 inserted therein and also to flood the interior of letters such as Q and D; similar upward movement of the other pump plunger will flood the connected space 23. When a pump plunger is moved reversely the liquid in the connected space falls by gravity back into the corresponding reservoir. Thus by moving the plunger of a reservoir the liquid therein may be forced to rise gradually from the bottom to the top of the associated liquid space and may then be permitted to fall gradually. The speed of movement of the liquid up and down the liquid space may be controlled by varying the rate of movement of the plunger. The two reservoirs 11 and 13 it is contemplated will be filled with different colored liquids, say, yellow in the reservoir 13 and blue in the reservoir 11.

Near the back of the inner casing 1 and in the upper and lower corners thereof are electric lamps 41 and 43 (Fig. 2) provided with reflectors 45 and 47 arranged to throw light from the lamps towards the front of the casing through the composite glass screen.

In the particular instance being described the front of the inner casing 1 carries a member 51 (Figs. 2 and 4) having at its upper end a recess 53 in which there can be inserted when desired a sheet of obscured or other glass 55; by obscured glass is meant glass that is slightly opaque. The glass of the other sheets 15, 17 and 19 and of the inner insertion pieces 25, 27 and 29 are of clear glass.

When the pump plunger 37 is rising in the pump barrel 11 there will be a tendency to form a vacuum in the lower part of the barrel which would normally tend to cause leakage of the liquid past the leather packing pieces 39. To counteract this one end of the drum is provided opposite each reservoir 11 and 13 with a conduit 61, there being a hole 63 to connect the conduit 61 with the part of the reservoir 11 below the plunger 37; there is also near the upper end of the conduit 61 a hole 65 to connect the said duct with the part of the reservoir 11 above the plunger 37. There may if desired be a non-return ball valve for example, at the connection 63 or 65. Instead of the aperture 65 at the upper end of the conduit 61 the latter may be connected by a tube as 68 (Fig. 1) with the top of the corresponding liquid space 21. Further, if desired there may be through the lower part of the wall of the chambers 11 and 13 apertures each closed by a ball valve as indicated at 69 (Fig. 4) to permit if necessary the entry of air.

The means for operating the pump plungers will now be described. Mounted upon the base 4 of the outer casing 3 is an electric motor 71 which is connected by gearing (indicated generally at 73) to a shaft 75 carried at the upper end of a pair of brackets, one of which is indicated at 77, mounted upon the base 4 of the outer casing. The shaft 75 has fixed upon it two grooved cams 81 and 83, the grooved faces of which are spaced from and face one another as indicated in Figs. 3 and 5. The forks of two forked connecting rods 85 and 87 embrace the shaft 75, the other ends of the connecting rods being pivoted to levers 88 and 89 which are adjustably fixed to the spindles 35 of the associated pump plungers. Mounted upon each of the connecting rods 85 and 87 is a roller (as 91) which enters the cam groove of the adjacent cam 81 or 83. Thus as the cams are rotated the connecting rods are forced laterally to rock the levers 88 and 89 and rock the pump plungers correspondingly. The parts may be so arranged that when one pump plunger is rising the other is falling, or in any other convenient manner, by suitably adjusting the levers 88 and 89 upon their respective plunger spindles.

The operation of the apparatus is as follows: Assume that light is switched on and that both plungers 37 are in lowermost position so that the two liquids are in their respective reservoirs. No lettering will appear since the light will pass through the clear glass and will simply light up the front of the screen. If now the rear plunger is gradually raised, liquid will rise in the rear space 23; the light will pass through a yellow layer of liquid and the whole screen will gradually assume a yellow color, the color creeping upwards from the bottom and the lettering be still invisible. If now the front plunger be raised blue liquid will rise in the space 21 and surround the glass pieces 25 and 27 and also 29. In consequence the sun and rays design and the lettering will appear gradually and will be yellow surrounded by a compound of yellow and blue, that is, green. By moving the plungers at other times (for example, simultaneously) variations can be obtained.

If there be inserted a colored glass at the back of the rear liquid space then the original background will be correspondingly colored instead of white, with the result that by the use of the two liquid colorings further variations can be obtained.

As the liquid will rise towards horizontal an appearance of diagonal rising may be obtained by tilting the apparatus or by fixing the lettering diagonally.

In the particular illustrative example, the apparatus and lettering are horizontal.

It will be understood that the apparatus may be arranged otherwise than horizontal; for example, it may be vertical with letters arranged one above the other. In place of lettering silhouettes of various devices may be used.

Further variation in coloring effect may be obtained by the use of multi-colored lamps with multiple-way switching.

It will be noted that with a motor-operated pumping apparatus as in the illustrative example, the color change is automatic and continuous during pumping.

In connection with large signs where the displacement of a considerable quantity of liquid is necessary small rotary pumps may be used; there may be automatic control of these pumps to give the variations that are desired.

Although an apparatus with two liquid spaces has been described it is to be understood that either more or less than two may be used according to the use to which the apparatus is to be put. Further, the liquid spaces may be other than rectangular and plane; for example, they may ascend spirally.

What we claim is:

1. Display apparatus, comprising a plurality of hollow compartments through which the light from one source may pass, said compartments, the walls of which are constructed of material being positioned one behind the other to form a compound screen, a reservoir for each compartment containing colored liquid, the liquid contained in each reservoir being of a different color, pumping means for each reservoir and adapted to force the liquid from each reservoir to its respective compartment to color the screen, and means for cyclicly operating the pumping means.

2. Display apparatus, comprising a plurality of hollow compartments, the walls of which are constructed of material through which the light from one source may pass, said compartments being positioned one behind the other to form a compound screen, a reservoir for each compartment containing colored liquid, the liquid contained in each reservoir being of a different color, pumping means for each reservoir and adapted to force the liquid from each reservoir to its respective compartment to color the screen, means for cyclicly operating the pumping means, and means for varying the phase of operation of one pump with respect to another.

3. A method of producing colored effects by lighting, comprising passing a beam of light through a plurality of transparent compartments, alternately filling each compartment with a colored liquid and discharging the liquid therefrom, and varying the phase of the cycle of filling and discharging of one compartment with respect to another.

4. Display apparatus, comprising a plurality of hollow compartments, the walls of which are constructed of material through which the light from one source may pass, said compartments being positioned one behind the other to form a compound screen, a reservoir for each compartment containing colored liquid, the liquid contained in each reservoir being of a different color, pumping means for each reservoir and adapted to force the liquid from each reservoir to its respective compartment to color the screen, means for causing simultaneous action of the plurality of pumping means, and means for varying the action of one pumping means relatively to that of another, whereby at any chosen location on the screen different color effects may be obtained.

5. Display apparatus, comprising a plurality of hollow compartments, the walls of which are constructed of material through which the light from one source may pass, said compartments being positioned one behind the other to form a compound screen, a reservoir for each compartment containing colored liquid, the liquid contained in each reservoir being of a different color, pumping means for each reservoir and adapted to force the liquid from each reservoir to its respective compartment to color the screen, and a display character in one of the compartments, whereby liquid may fill the compartment to surround the character.

6. Display apparatus, comprising a plurality of hollow compartments, the walls of which are constructed of material through which the light from one source may pass, said compartments being positioned one behind the other to form a compound screen, a reservoir for each compartment containing colored liquid, the liquid contained in each reservoir being of a different color, pumping means for each reservoir and adapted to force the liquid from each reservoir to its respective compartment to color the screen, a display character in one of the compartments, means for flooding that compartment with liquid to outline the character, and means for flooding another compartment with liquid to color the character.

7. Display apparatus, comprising a plurality of hollow compartments, the walls of which are constructed of material through which the light from one source may pass, said compartments being positioned one behind the other to form a compound screen, a reservoir for each compartment containing colored liquid, the liquid contained in each reservoir being of a different color, pumping means for each reservoir and adapted to force the liquid from each reservoir to its respective compartment to color the screen, said reservoirs comprising two substantially semi-spherical chambers on opposite sides of a partition, and the pumping means in each chamber comprising a paddle pivoted on the partition.

Dated this 24th day of July, 1931.
PERCY BURRELL.
JOHN ALLEN BOOTHROYD.